(12) United States Patent
Oztekin et al.

(10) Patent No.: US 9,298,837 B2
(45) Date of Patent: Mar. 29, 2016

(54) EFFICIENT INDEXING AND CACHING INFRASTRUCTURE FOR METASEARCH

(71) Applicant: Room 77, Inc., Mountain View, CA (US)

(72) Inventors: Bilgehan Uygar Oztekin, Sunnyvale, CA (US); Ian Webster, Mountain View, CA (US); Jie Chen, Mountain View, CA (US); Sungsoon Cho, Sunnyvale, CA (US); Nicholas Edelman, Mountain View, CA (US); Calvin Cheng Yang, Foster City, CA (US)

(73) Assignee: Room 77, Inc., San Francisco, CA (US)

( * ) Notice: Subject to any disclaimer, the term of this patent is extended or adjusted under 35 U.S.C. 154(b) by 541 days.

(21) Appl. No.: 13/672,622

(22) Filed: Nov. 8, 2012

(65) Prior Publication Data

US 2013/0124237 A1 May 16, 2013

Related U.S. Application Data

(60) Provisional application No. 61/557,915, filed on Nov. 10, 2011.

(51) Int. Cl.
*G06F 17/30* (2006.01)
*G06Q 10/02* (2012.01)

(52) U.S. Cl.
CPC ............ *G06F 17/3087* (2013.01); *G06Q 10/02* (2013.01)

(58) Field of Classification Search
None
See application file for complete search history.

(56) References Cited

U.S. PATENT DOCUMENTS

| | | |
|---|---|---|
| 5,614,703 A | 3/1997 | Martin et al. |
| 5,948,040 A | 9/1999 | DeLorme et al. |
| 6,266,649 B1 | 7/2001 | Linden et al. |
| 7,003,136 B1 | 2/2006 | Harville |
| 7,076,451 B1 | 7/2006 | Coupland et al. |
| 7,134,088 B2 | 11/2006 | Larsen |
| 7,152,064 B2 | 12/2006 | Bourdoncle et al. |
| 7,584,110 B2 | 9/2009 | Robertson |
| 8,447,757 B1 | 5/2013 | Cox |
| 2002/0137523 A1* | 9/2002 | Diggelen ............... 455/456 |
| 2002/0152127 A1 | 10/2002 | Hamilton et al. |
| 2003/0040946 A1 | 2/2003 | Sprenger et al. |
| 2003/0058283 A1 | 3/2003 | Larsen |
| 2003/0120523 A1 | 6/2003 | Jafri et al. |
| 2004/0098609 A1 | 5/2004 | Bracewell et al. |
| 2005/0050101 A1 | 3/2005 | Vockley et al. |
| 2005/0071741 A1* | 3/2005 | Acharya et al. ............... 715/500 |
| 2005/0262062 A1* | 11/2005 | Xia ................................. 707/3 |
| 2006/0100722 A1 | 5/2006 | Bell |

(Continued)

OTHER PUBLICATIONS

Korean Patent Office, "International Search Report", in application No. PCT/US2012/064240 dated Mar. 29, 2013, 10 pages.

(Continued)

*Primary Examiner* — Syed Hasan
(74) *Attorney, Agent, or Firm* — Hickman Palermo Becker Bingham LLP; Daniel D. Ledesma

(57) ABSTRACT

Techniques are provided for a metasearch infrastructure. The metasearch infrastructure supports one or more of the following: hotel matching, backend support of user queries, frontend support for user queries, a cache layer that groups or organizes cached data in storage based on hotel location, scoring and ranking on the client side, experiments and rankers, duplicate booking prevention, blacklisting hotels, and indexing that utilizes a document-independent data structure to store index values.

20 Claims, 6 Drawing Sheets

(56) References Cited

U.S. PATENT DOCUMENTS

| | | |
|---|---|---|
| 2006/0149586 A1 | 7/2006 | Brown |
| 2007/0043770 A1 | 2/2007 | Goodrich et al. |
| 2007/0067193 A1 | 3/2007 | Robertson |
| 2007/0073562 A1 | 3/2007 | Brice et al. |
| 2007/0110338 A1 | 5/2007 | Snavely et al. |
| 2007/0156660 A1 | 7/2007 | Moricz |
| 2008/0071763 A1 | 3/2008 | Ferrenq et al. |
| 2008/0126022 A1 | 5/2008 | Hoguet |
| 2008/0174598 A1 | 7/2008 | Risenhoover |
| 2008/0189243 A1 | 8/2008 | Li et al. |
| 2008/0192053 A1 | 8/2008 | Howell et al. |
| 2008/0208843 A1 | 8/2008 | Nagasawa |
| 2008/0215626 A1 | 9/2008 | Gomez |
| 2008/0275673 A1 | 11/2008 | Klipfel |
| 2008/0319803 A1 | 12/2008 | Heyraud et al. |
| 2009/0063167 A1 | 3/2009 | Bartot et al. |
| 2009/0182636 A1 | 7/2009 | Gilula |
| 2009/0262206 A1 | 10/2009 | Park |
| 2009/0287596 A1 | 11/2009 | Torrenegra |
| 2009/0307020 A1 | 12/2009 | Viale et al. |
| 2010/0023252 A1 | 1/2010 | Mays et al. |
| 2010/0169262 A1* | 7/2010 | Kenedy ............... H04W 12/08 706/50 |
| 2010/0211419 A1 | 8/2010 | Nickolayev et al. |
| 2010/0293011 A1 | 11/2010 | Lebreton et al. |
| 2010/0305984 A1 | 12/2010 | Ben-Yitschak et al. |
| 2010/0306213 A1 | 12/2010 | Taylor et al. |
| 2011/0055284 A1 | 3/2011 | Wallace et al. |
| 2011/0173229 A1* | 7/2011 | Choudhury et al. .......... 707/770 |
| 2012/0066013 A1 | 3/2012 | Natsuyama et al. |
| 2013/0124564 A1 | 5/2013 | Oztekin et al. |

OTHER PUBLICATIONS

Current Claims in application No. PCT/US2012/064240 dated Mar. 2013, 6 pages.

\* cited by examiner

EFFICIENT INDEXING AND CACHING INFRASTRUCTURE FOR METASEARCH

CROSS-REFERENCE TO RELATED APPLICATIONS

Benefit Claim

This application claims the benefit of U.S. Provisional Application No. 61/557,915, filed Nov. 10, 2011, the entire contents of which is hereby incorporated by reference as if fully set forth herein, under 35 U.S.C. §119(e).

This application is related to U.S. patent application Ser. Nos. 13/208,147 and 13/208,153 filed on Aug. 11, 2011, the entire contents of both of which is hereby incorporated by reference as if fully set forth herein.

This application is related to U.S. patent application Ser. No. 13/672,617 filed on same day herewith, the entire contents of which is hereby incorporated by reference as if fully set forth herein.

FIELD OF THE INVENTION

The present invention relates to a metasearch infrastructure and, more specifically, to efficient searching of information about temporary lodging establishments, such as hotels.

BACKGROUND

When planning a vacation or a business trip, many users use travel web sites that provide information about multiple hotels to make a reservation. One problem that needs to be addressed by travel web sites is providing up-to-date and accurate hotel information to users so that users are able to find the best current deals. If a user uses multiple travel web sites to find great deals in a particular city and one of the travel web sites consistently provides the best options, then the user is less likely to frequent the other travel web sites. If a travel web site informs a user about a possible reservation for a first price at a hotel when the hotel is only offering reservations at a second price that is higher than the first price, then the user becomes frustrated and is less likely to use the travel web site in planning future trips.

Another problem that needs to be addressed by travel web sites is managing the large amount of hotel information that must be retrieved on a daily, and sometimes more frequent, basis. One way to address this problem is to purchase or lease significant amount of computer resources, specifically, processors, network and disk I/O, caches, and data storage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Individual Habitable Units

An individual habitable unit is a structure that one or more persons may reside in for a period of time, usually for a fee. Non-limiting examples of IHUs include hotel rooms, motel rooms, houses, rooms in a house, apartments, condominiums, cottages, cabins, lodges, and bungalows. Thus, an IHU may be purchased or rented by one or more individuals. A set of IHUs may be owned, managed, and maintained as a single entity or establishment (e.g., Hilton™ or Courtyard by Marriot™), which may consist of one or more building structures. Non-limiting examples of such building structures include hotels, motels, apartment complexes, and a condominium complex. A set of IHUs that are maintained or managed by a single business entity or establishment may cover just a few acres of land, although some larger complexes, such as vacation resorts, may consist of IHUs that are spread across a square mile or two. A single business entity or establishment may own or manage different sets of IHUs in different locations, such as one set of IHUs in San Francisco, Calif. and another set of IHUs in Las Vegas, Nev.

An IHU may consist of a single room. However, some IHUs consist of two or more rooms, which might be divided by a wall (or other divider) that includes a door between two rooms of the same IHU.

Also, many IHUs, like many hotel and motel rooms, have one or more walls that adjoin another IHU. IHUs form a "contiguous set" when each IHU in the set shares a wall with at least one other IHU in the set. However, in some cases, IHUs that are part of the same complex do not share walls with any other IHUs in the set. For example, a business entity may own a set of separately-situated bungalows or cottages within a small geographical area, such as a few acres.

Many building structures that include multiple IHUs comprise multiple floors, with multiple IHUs on each floor. In many cases, each floor of such a building structure has the same floor plan. Thus, the set of IHUs on one floor might have the same dimensions and arrangement as another set of IHUs on another floor of the same building.

For purposes of brevity, examples shall be given hereafter in which the IHUs are hotel rooms, and the building complexes to which the IHUs belong are hotels. However, the techniques described herein are not limited to any particular type of IHU or building complex.

System Overview

Figure 1:
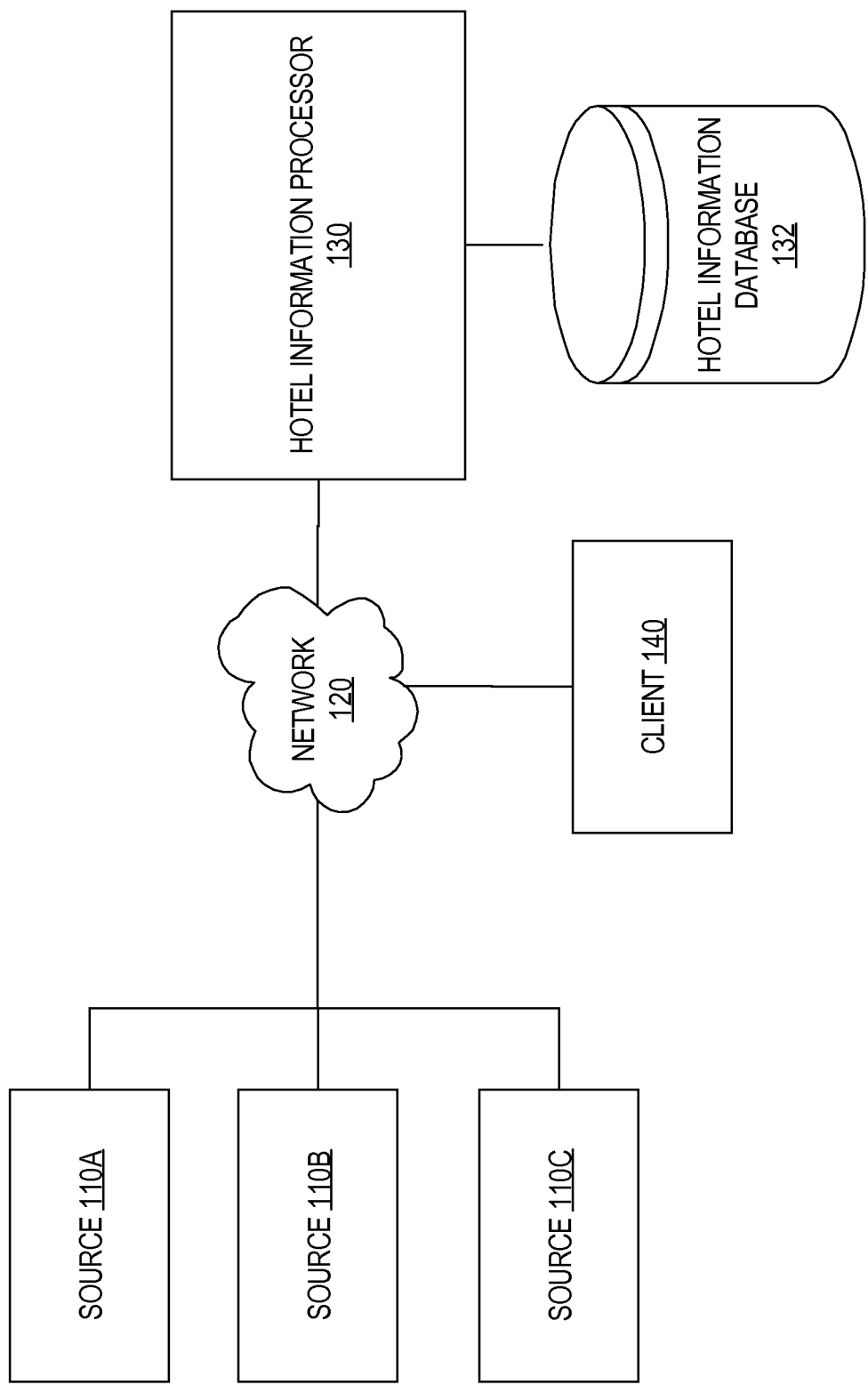
FIG. 1 is a block diagram that depicts a system for obtaining hotel information from multiple sources and providing hotel information to users, in an embodiment.

FIG. 1 is a block diagram that depicts a system 100 for obtaining hotel information from multiple sources and providing hotel information to users, in an embodiment. System 100 comprises sources 110A-C, network 120, hotel information processor 130, hotel room database 132, and client 140. Although three sources 110A-C are depicted, other embodiments may include less or more than three sources. Also, although one client 140 is depicted, embodiments may include hundreds or thousands of clients.

Each of sources 110A-C is a source of hotel information to hotel information processor 130. Each of sources 110A-C may provide hotel information directly to clients, such as client 140.

Each of sources 110A-C may provide its own interface to allow hotel information processor 130 to request and receive hotel information from the source. Embodiments are not limited to any particular technique for communicating hotel information from sources 110A-C to hotel information processor 130. An example of one technique is the hypertext transfer protocol (HTTP), where source 110A may include a web server that accepts and processes HTTP requests from hotel information processor 130 and provides HTTP responses that include hotel information in response to the HTTP requests. As another example, source 110B provides a web service through which hotel information processor 130 requests hotel information. Source 110B may initially provide, to hotel information processor 130, a Web Services Description Language (WSDL) document. WSDL is an XML-based language that is used for describing the functionality offered by a web service. A WSDL document is a machine-readable description of how the web service can be called, what parameters the web service expects, and what data structures the web service returns. JSON (JavaScript Object Notation) over HTTP is another example of a technique for communicating hotel information from sources 110A-C to hotel information processor 130. JSON a text-based open standard designed for human-readable data interchange.

Thus, sources 110A-C may provide hotel information to hotel information processor 130 in response to requests from hotel information processor 130. Alternatively, one or more of sources 110A-C may send hotel information to hotel information processor 130 without having to receive an explicit request for each communicated set of hotel information. For example, hotel information processor 130 may subscribe to source 110A to daily receive hotel information therefrom.

At least one of sources 110A-C may be a content aggregator that retrieves hotel information from multiple sources and provides content to users. Examples of content aggregators include Orbitz™ and Expedia™. Additionally or alternatively, at least one of sources 110A-C is a web site that provides hotel information of a particular hotel chain and that is owned by the hotel chain or managed by a third party on behalf of the hotel chain. Examples of hotel chains include Marriot™ and Hilton™.

Sources 110A-C and client 140 communicate with hotel information processor 130 over network 120. Network 120 may be implemented by any medium or mechanism that provides for the exchange of data between the elements of FIG. 1. Examples of network 120 include, without limitation, a network such as a Local Area Network (LAN), Wide Area Network (WAN), Ethernet or the Internet, or one or more terrestrial, satellite or wireless links.

Hotel information processor 130 receives hotel information from one or more sources 110A-C and processes the hotel information to allow the efficient storage thereof and allow users to request and receive hotel information in a convenient, easy-to-read format. Hotel information processor 130 comprises numerous hardware elements, such as processors, caches, other volatile memory, and non-volatile storage devices. While hotel information processor 130 is depicted as a single entity, hotel information processor 130 may comprise numerous machines that communicate with each other (e.g., over a LAN, WAN, or the Internet). Hotel information processor 130 also comprises software instructions that are executed by the processors to perform certain functions in relation to sources 110A-C, in relation to the hotel data received from sources 110A-C, and in relation to client 140.

Hotel database 132 may comprise one or more data storage elements, which may comprise volatile memory and/or non-volatile memory. Hotel database 132 stores hotel data that originates from sources 110A-C and, optionally, additional data that hotel information processor 130 generates when processing the hotel data, such as indexes, blacklists, scores and rankings, etc.

Not only may each of sources 110A-C use a different protocol to send hotel information to hotel information processor 130, each of sources 110A-C may format hotel information differently. Thus, hotel information processor 130 is configured to convert hotel data from one or more of sources 110A-C into a format that is used by one or more other sources 110A-C or that is only used by hotel information processor 130. For example, data from one of sources 110A-C may be formatted as multiple strings, where each string corresponds to a single hotel and includes hotel features in a particular order (such as name, followed by address, followed by one or more phone numbers, following by geographical data), where each hotel feature is delimited by a comma (,), and where each hotel is delimited by a semi-colon (;). Data from another one of sources 110A-C may be formatted completely differently.

Client 140 is a device that is capable of communicating with hotel information processor 130 over network 120. Examples of client 140 include a desktop computer and a mobile device, such as a smartphone, a laptop computer, and a tablet computer. Client 140 executes software that allows client 140 to send one or more requests or queries to hotel information processor 130. Examples of the software include a web browser or a dedicated application (e.g., a "mobile app") that is developed specifically to communicate with hotel information processor 130. If client 140 communicates with hotel information processor 130 via a web browser, then hotel information processor 130 formats response data in HTML and may include browser-executable code (e.g., JavaScript) to allow the web browser to communicate with hotel information processor 130 in an efficient manner, described in more detail later.

Hotel Matching

When receiving hotel data from multiple sources, much of the hotel data from each source will have overlap with hotel data from another source. For example, both source 110A and source 110B may provide have information about Hotel X. If duplicate hotel information is not removed, then less unique information is displayed to the user. As a result, the convenience and usability of the provider of hotel information processor 130 decreases. Thus, when collecting hotel information from multiple sources, one purpose is to merge as many duplicates as possible.

However, determining whether one hotel from one source is already reflected in hotel data from another source may be difficult due to multiple factors, namely, some sources may have inaccurate, incomplete, or out-of-date information. For example, hotel names and phone numbers may change, which may not be reflected immediately in all sources. Geographical coordinates (such as latitudinal and longitudinal coordinates) may be inaccurate. Addresses may contain typos (like every other hotel attribute), abbreviations, or alternate ways of spelling. City name or location information may not always match. For international destinations, sources may have alternative spellings or corresponding names in different languages (e.g., English v. local spelling). Some sources use Unicode characters whereas others are limited to English spelling and ASCII characters.

In order to implement a high coverage and high precision hotel matching algorithm, a fuzzy match approach is followed that utilizes as much available information as possible using engineered features while not penalizing potential matches too much (or at all) for missing information.

Figure 2:
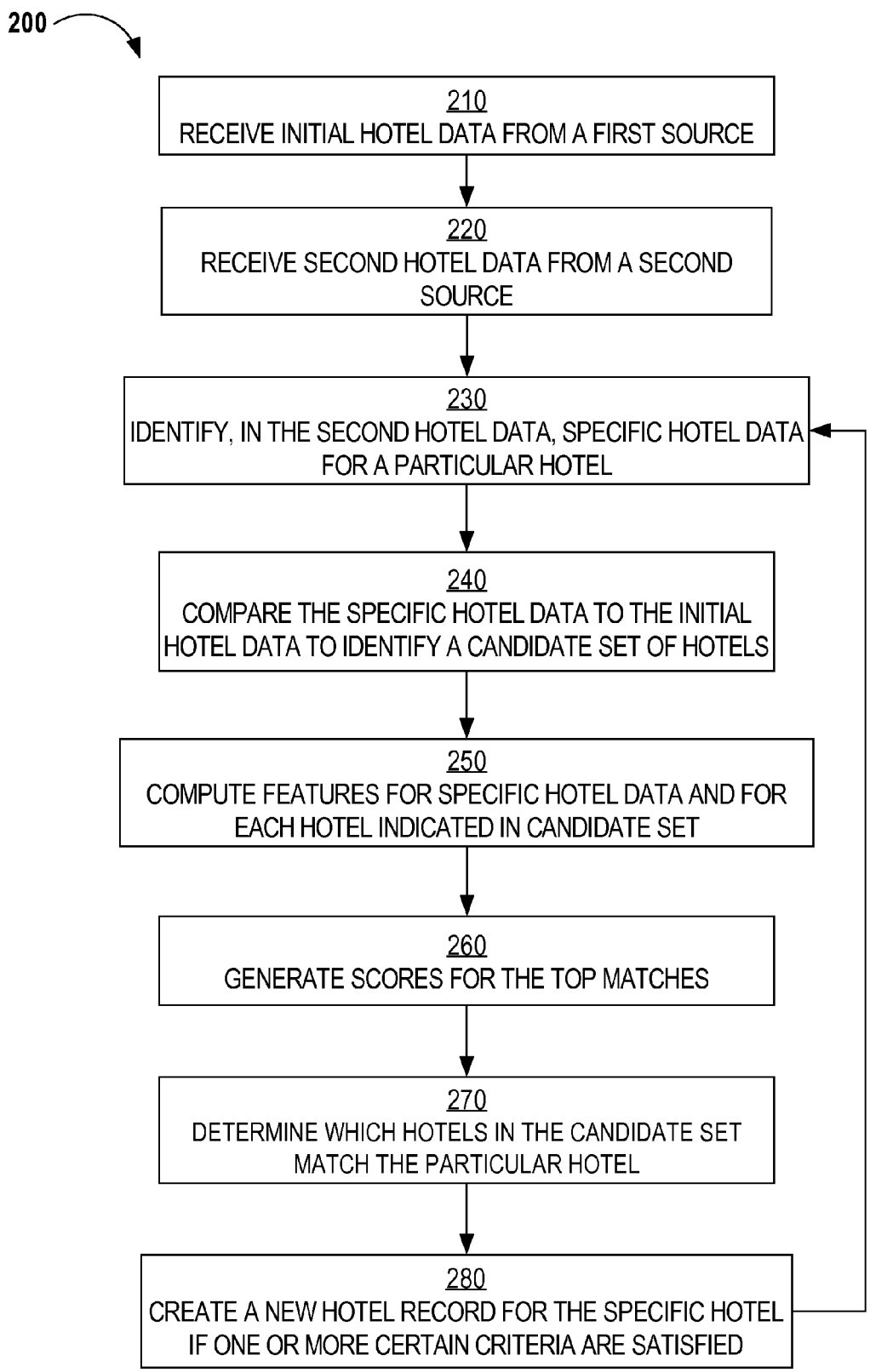
FIG. 2 is a flow diagram that depicts a process for matching hotel data from one source with hotel data from another source, in an embodiment.

FIG. 2 is a flow diagram that depicts a process 200 for matching hotel data from one source with hotel data from another source, in an embodiment. Process 200 may be performed by hotel information processor 130.

At block 210, hotel data from one source is received. The hotel data may be data from another entity, such as source 110A. Alternatively, the hotel data may be established automatically by hotel information processor 130 or manually by one or more persons affiliated with hotel information processor 130. Regardless of where the initial hotel data originates, the initial hotel data is used as the base set against which hotel data from one or more other sources is compared. It may be presumed that the initial hotel data is free of duplicates; however it is possible for the initial hotel data may contain duplicates.

Hotel data for a particular hotel comprises one or more attributes, such as hotel name, address, phone number, and geographical location. The actual value for each attribute is referred to herein as an attribute value. For example, the phone number 408-123-4567 is an attribute value of a phone number attribute of a particular hotel.

In an embodiment, a unique hotel identifier (hereinafter "HID") is generated for each hotel identified in the initial hotel data. Alternatively, hotel information processor 130 leverages a source hotel identifier (herein after "SID") that the corresponding source uses to keep track of each hotel. Thus, hotel information processor 130 may use the SID of a hotel as an HID to distinguish that hotel from all other hotels of which hotel information processor 130 stores information. Alternatively, hotel information processor 130 may have rules to map or transform SIDs from a particular source to internal HIDs in a way to identify the source easily and unambiguously, yet represent HIDs as compactly as possible with a minimum of address space. For example, SIDs may be appended a unique and unambiguous pattern at the end of the number (e.g. 8, 9, 90, 91, 92, 80, 81). Hotel information processor 130 may identify from where the HID is originated by looking at the pattern.

In an embodiment, block 210 involves normalizing attribute values reflected in the initial hotel data to prepare the attribute values for being compared to attribute values from other sources. For example, accents in Unicode characters may be removed, all characters may be made lowercase, some characters that are not considered useful may be removed, abbreviations may be extended (e.g., "St." becomes "street" and "ave." becomes "avenue"), and spelled out numbers (e.g., "two") become numerals (e.g., "2").

At block 220, second hotel data from a second source is received. For example, the initial hotel data is from source 110A while the second hotel data is from source 110B. The hotel data from each source may be in very different formats. Thus, before matching of hotel data occurs, one or both of the initial hotel data and the second hotel data is modified to be in a format that is common to both hotel data. Similar to block 210, block 220 may involve normalizing the second hotel data.

Not only may different sources format hotel data differently, but different sources may provide a different amount of hotel data for each hotel. For example, source 110A may include geographical coordinates for each hotel while source 110B does not. As another example, source 110B may include one or more phone numbers for each hotel while source 110C does not. Furthermore, the level and amount of detail for each hotel may vary from a single source.

At block 230, hotel data for a particular hotel indicated in the second hotel data is identified. Blocks 240-270 may be performed for each hotel indicated in the second hotel data.

At block 240, the hotel data for the particular hotel is matched against hotel data of multiple hotels indicated in the initial (or base) hotel data. The multiple hotels may be all the hotels indicated in the initial hotel data. The level of "match" in block 240 involves a relatively low threshold. For example, multiple passes against the initial hotel data are made, each pass comparing one or more attribute values of the particular hotel with the corresponding one or more attribute values of each hotel reflected in the initial hotel data. One pass may compare the phone number of the particular hotel against the phone number of each hotel reflected in the initial hotel data. This pass may yield zero or more results. Another pass may compare the latitude and longitude coordinates of the particular hotel (if they exist) against the latitude and longitude coordinates of each hotel reflected in the initial hotel data. This pass may yield zero or more results. Another pass may compare the city name of the particular hotel against the city name of each hotel reflected in the initial hotel data. This pass will likely yield multiple results. Another pass may compare the name of the particular hotel against the hotel name of each hotel reflected in the initial hotel data. The results of each pass are combined (e.g., "OR'd") to yield a "candidate set."

Comparing hotel names may involve determining whether two hotel names are exact matches. Alternatively, comparing hotel names may involve a "fuzzy" match, such as determining how many tokens are in common. For example, the hotel name of the particular hotel may be "Marriott San Francisco Fisherman's Wharf" while the hotel name of a hotel identified in the initial hotel data may be "Courtyard by Marriott San Francisco." Both hotel names include three tokens in common: "Marriott," "San," and "Francisco." In the token counting approach to determining a fuzzy match, a rule may be that three (or two) matching tokens is sufficient to be considered a match and, thus, the hotel from the initial hotel data is added to the candidate set.

Alternatively to the multi-pass approach, a single pass is performed and, for each hotel identified in the initial hotel data, multiple comparisons are performed, where each comparison involves a different hotel attribute. This "single pass" approach should yield the same number of candidates as the "multi-pass" approach, as long as the results of each comparison are "OR'd" together and as long as the results of each pass are "OR'd" together.

Alternatively to the multi-pass and single pass approaches, a single list (e.g., implemented as balanced binary tree) is maintained to aggregate the candidate set and update the scores on the fly. For example, according to criterion 1, hotel X is a candidate. Criterion 1 suggests a score for hotel X. The hotel X (or rather, data identifying hotel X) is inserted into the data structure along with the score. Criterion 2 also suggests a score for hotel X. In that case, the score for hotel X that was already in the data structure is updated with the new score (e.g. summation or another combination operation). In this way, the list of hotels grows with updated scores rather than first having multiple lists first and then merging the lists.

Either approach may rely on exact matches (or near exact matches) to produce the candidate set. Exact matches at this stage may be acceptable because two sets of hotel data (from different sources) for a particular hotel should share at least one attribute value in common.

Thus, block 240 may be characterized as rudimentary matching and basic scoring that uses multiple scoring criteria. For example, if the geographical coordinates are within a certain distance or the respective cities match or the phone number matches, then a candidate hotel is found. Block 240 may also involve scoring of candidate hotels based on other criteria, such as the number of tokens that match (in a city name, address, etc.)

If the candidate set is not empty, then process 200 proceeds to block 250. Else, the particular hotel may be unique to the second source and process 200 then proceeds to block 280.

At block 250, features are computed for the particular hotel and for each hotel in the candidate set. Because different hotels may have a different set of attributes, one iteration of block 250 may involve computing a first number of features (e.g., four) while another iteration of block 250 may involve computing a second number of features (e.g., three) that is different than the first number.

Block 250 may be characterized as an advanced matching where the scores of the top candidates are updated with elaborate scoring mechanism(s), such as a more elaborate function to computer a lat/long score, token-based similarity, edit distance, etc.

The following are exemplary features: name similarity, latitude/longitude ("lat/long") similarity, address similarity, and phone number similarity. Approaches for calculating features for each are described as follows. Determining a score for each feature may involve one or more approaches.

For name similarity, in one approach, the number of common tokens is divided by the number of unique tokens to generate a score that reflects how similar two hotel names are. In the above example of "Marriott San Francisco Fisherman's Wharf" and "Courtyard by Marriott San Francisco," there are three tokens in common, but seven total unique tokens, which results in 3/7: a score of under 0.5.

In another approach, a feature for name similarity is generated based on edit distance between two hotel names. The edit distance between two hotel names refers to the number of characters that have be changed (e.g., added, deleted, or modified) in a first hotel name in order to transform the first hotel name into the second hotel name. In an embodiment, the tokens of one or more of the hotel names are re-ordered before the edit distance is calculated. In an embodiment, certain tokens are given less weight than other tokens. For example, common tokens such as "the," "by," and "in" are not considered significant matches and, consequently, are not scored as highly as uncommon tokens that do match or nearly match.

Although two approaches for generating a feature to indicate name similarity are described, embodiments may involve other approaches. Regardless of the type and number of approaches, the results of each approach may be combined to generate a single score for the hotel name attribute.

For lat/long similarity, two lat/long coordinates are compared to determine the distances between the two hotels. The closer the surface distance of each hotel to each other, the higher the score. In a variation of this approach, if the computed surface distance is between a certain range (e.g., 20 miles to 40 miles), then the similarity score is penalized. But if the computed surface distance is outside that range (e.g., greater than 40 miles), then there is no penalty (or no additional penalty beyond the end of the certain range (e.g., 40 miles). If the differences are so great (e.g., thousands of miles), then two hotels may not be considered the same. A significant distance may actually result from one of the coordinates being a typo. If great distances were penalized, then a typo could almost always result in a very negative score, causing the two hotels to never being considered as the same hotel. In a related approach, the lat/long of a hotel in the candidate set is used to find the hotel on a map. If the lat/long indicates that the hotel is in the middle of a body of water (e.g., the Atlantic Ocean) or in an inhabitable geographic region (e.g., the South Pole), then a score for the lat/long feature is not computed. Additionally, it may be determined whether the lat/long of a hotel is anywhere near a city, state, or country that is listed for that hotel. This determination may be possible if hotel information processor 130 maintains lat/longs for cities, states, or countries. If the lat/long of the hotel is far away from the lat/long of a city center, for example, then the lat/long may be discarded when computing a score for the hotel.

For address similarity, one or more normalization steps are performed (if the steps have not already been performed), such as expanding abbreviations (e.g., "st." to "street"), making all characters lower case, and identifying alternate spellings of city and/or street names (e.g., Kapadokia v. Kapadokya). City names of two may be compared by taking into account edit distance, pronunciation distance, and/or typing distance.

For phone number similarity, phone numbers may be normalized using one or more techniques. Examples of normalization techniques include removing dashes, parenthesis, spaces, and '+' from the country code. If a country code of a hotel is missing, then the country code may be guessed based on country information that is available.

Each feature contributes to a final score of a candidate match. Features may be designed to be "neutral" if one or both of the hotels are missing a particular type of information (e.g., phone number or lat/long). In an embodiment, a feature may contribute to a final score positively or negatively. Two different types of algorithms may be implemented: a heuristic-based algorithm and a machine learning-based algorithm trained through training examples. The machine learning-based algorithm may be trained using a known set of matches whose feature scores are randomly perturbed or "sparsified," as well as a human-generated small set of training data. As inaccuracies are identified, they can be added to the training set.

At block 260, scores are generated based on the computed features for each candidate.

At block 270, it is determined which hotels in the candidate set match the particular hotel. In an embodiment, not only are scores of each candidate match considered, but also their relative magnitude. For example, if only one hotel matched significantly better than the rest with a medium match score, then that one hotel may be deemed a likely match. However, if more than one hotel matched with the same/similar scores, then more evidence may be required. In case of multiple "good" matches, if the scores are sufficiently high, then these multiple matches are accepted. This approach may be acceptable because some sources have duplicate entries.

At block 280, a new hotel record is created for the particular hotel, if certain criteria are satisfied, such as all scores in the candidate set being below a certain threshold, indicating that the particular hotel is not indicated in the initial hotel data. Block 280 may involve generating a new (unique) HID, generating a new object or record that stores the attribute values of the particular hotel, and associating the new HID with the new object/record. This "new" hotel may later become part of the initial hotel data if hotel data from a third source is received and used to compare against the initial hotel data.

In some situations, multiple hotels from a single source (e.g., source 110A) may match a hotel in the initial set. This situation may indicate that there are duplicates in the hotel data from that source. Therefore, if two hotels X and Y (identified in data from a single source) are determined to match hotel A (in the initial set) based on different iterations of blocks 230-280, then, in an embodiment, the hotel with the higher score is maintained and the hotel with the lower score is dropped.

In an embodiment, the matching algorithm (or a version thereof) described above is executed against the initial hotel data in order to identify and remove duplicates from the initial hotel data.

Backend Design to Support Queries

Figure 3:
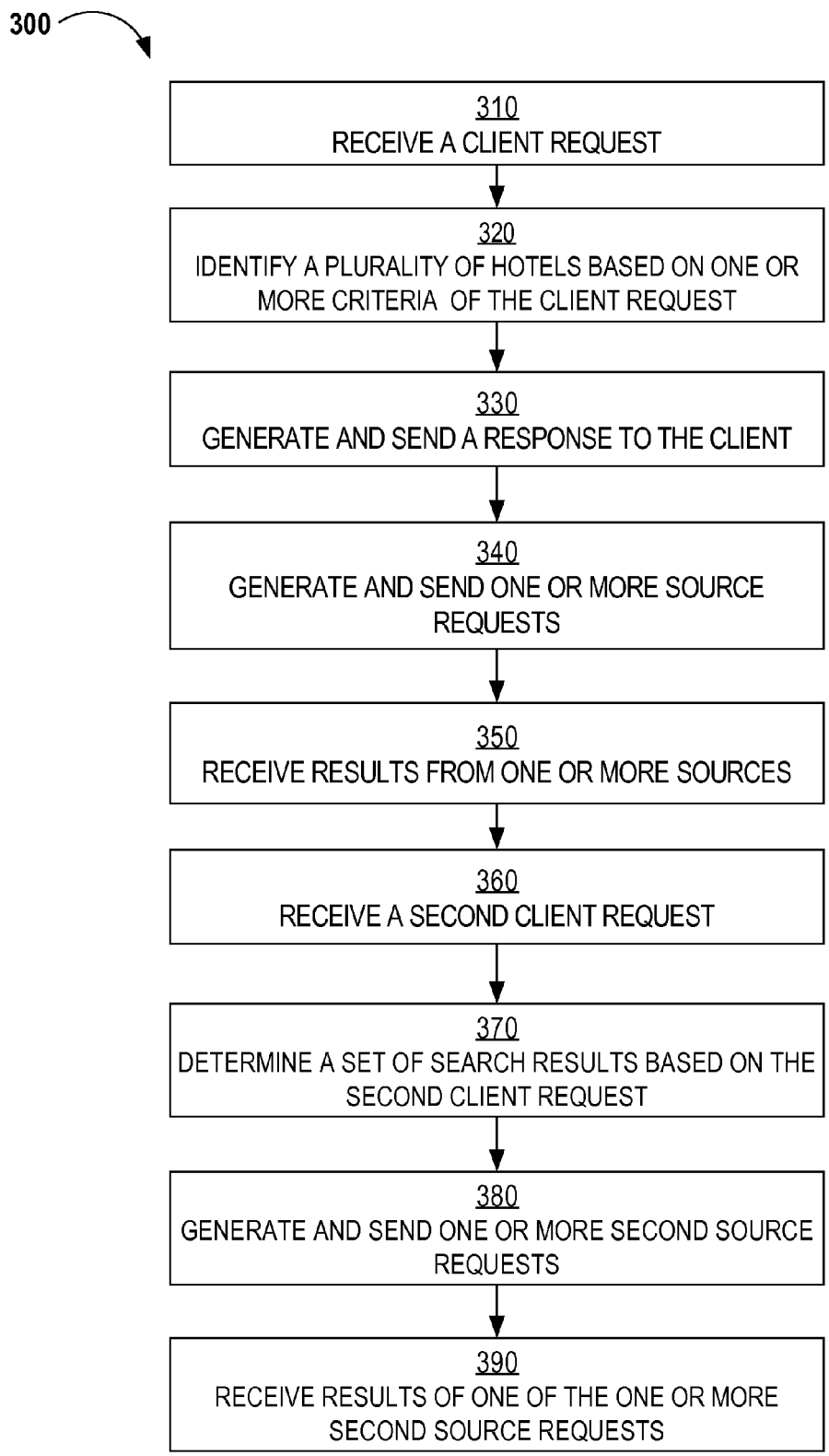
FIG. 3 is a flow diagram that depicts a process for processing a request from a client device, in an embodiment.

Because numerous clients (e.g., including client 140) may be requesting hotel information from hotel information processor 130 simultaneously, it is important for hotel information processor 130 to efficiently process client requests so that the clients may have accurate results without having to wait for a significant amount of time. FIG. 3 is a flow diagram that depicts a process 300 for processing a request from client 140, in an embodiment. Process 300 is performed by hotel information processor 130. Different components of hotel information processor 130 may perform different blocks of process 300.

At block 310, a request from client 140 is received. The client request may specify a location, such as a city name and/or state (e.g., "New York City"), a name of landmark or park (e.g., "Yosemite"), or a name of business that has a known location (e.g., "San Francisco 49ers"). The client request may also specify a date (e.g., "Oct. 24, 2014") or date range (e.g., "2014 October").

At block 320, data that satisfies the one or more criteria of the client request is identified based on "local" information. Local information is information that is "local" relative to hotel information processor 130. The information may be on a storage device that is physically coupled to hotel information processor 130 or that is connected to a LAN or WAN of which hotel information processor 130 is also a part. Alternatively, hotel information processor 130 is communicatively coupled to the storage device over the Internet. Based on the specified location and date(s), hotel information processor 130 identifies a number of hotels that are in or near the specified location and that are available on the specified date. The set of servers and storage devices that are used to respond to user requests may be distributed based on which are used most frequently. Those used less frequently may be connected via the Internet or WAN as opposed to a LAN.

However, hotel information processor 130 may not have current, local information regarding the availability of certain hotels on certain dates. Instead, hotel information processor 130 may have information that was current as of, for example, 13 hours prior to the reception of the client request. Therefore, hotel information processor 130 may identify a hotel that is identified locally as available on a certain date but that is not in fact available on that date. Availability is one attribute that hotel information processor 130 may determine and send to client 140, even after providing an initial response to the request to client 140. Pricing is another attribute that hotel information processor 130 may determine later and send to client 140.

The client request may include one or more criteria other than location and date, such as certain hotel amenities, a certain price or range of prices, or a certain percentage discount or absolute discount off a "normal" or listed price. If so, then hotel information processor 130 may exclude search results (i.e., hotels) that do not fit the one or more other criteria.

Block 320 may involve ranking the search results (i.e., the identified set of hotels) based on one or more criteria, such as location, price, current availability, and discount. Ranking may involve generating a score for each hotel in the identified set of hotels and then ordering the set of hotels based on the score for each hotel.

At block 330, a response to the client request is generated and sent, to client 140. The response includes hotel information associated with each search result (i.e., hotel that satisfies all (or most) of the one or more criteria of the client request). Examples of the hotel information may include a name of the hotel, an address of the hotel, a picture or logo of the hotel, a price of the hotel, an availability of the hotel, and/or a description of the hotel. The response may also include a hotel identifier ("hotel ID") for each identified hotel. The hotel IDs may be generated and recognized by hotel information processor 130 but not by any one of sources 110A-C. The response may also include the generated score and/or ranking associated with each identified hotel to allow client 140 to modify the ranking of hotels based on additional criteria that the user may specify or that client 140 may receive from hotel information processor 130.

Because hotel information processor 130 may not have any information (much less current information) for a particular attribute (such as pricing), hotel information processor 130 may rely on old or "stale" information and send that "stale" information to client 140 while hotel information processor 130 waits to receive current information from one or more of sources 110A-C.

At block 340, one or more "source requests" are generated. Block 340 may occur before block 330 or after block 330. A "source request" is a request, to be sent to one of sources 110A-C, for current information of one or more hotels. The current information may include availability information on certain dates and/or pricing information (which may vary on certain dates).

In an embodiment, because each of sources 110A-C uses different information to identify and describe a hotel, a source request includes information that each of sources 110A-C recognizes. For example, a source request may include source identifiers ("SIDs") that identify specific hotels and that are recognized by the corresponding source (e.g., source 110A). Thus, block 340 may involve using a mapping that maps HIDs (that are recognized by hotel information processor 130) to SIDs (that are recognized by the corresponding source). For example, if a source request is a request for information about 100 hotels from source 110A, then hotel information processor 130 uses the mapping to translate 100 HIDs into 100 SIDs. The 100 SIDs are then included in the source request. In many situations, not all HIDs may have a mapping for each source. For example, source 110A may have a mapping for 80 of the 100 hotels, source 110B may have a mapping for 74 of the 100 hotels, etc.

In an embodiment, block 340 involves generating two source requests that are directed to the same source (e.g., source 110A). One source request is generated for the first M search results (each search result corresponding to a different hotel). The second source request is generated for the next N search results. This is referred to herein as the "multiple request-per-source technique."

For example, if one hundred hotels satisfy the client request received in block 300, then a first source request is generated that requests hotel information for the first five hotels and a second source request is generated that requests hotel information for the next 95 hotels.

One or more criteria may be taken into account when determining how large a client request or source request will be. Client 140 may take the one or more criteria into account in determining the size of client requests. Additionally or alternatively, hotel information processor 130 may take the one or more criteria into account in determining the size of source requests. Examples of such criteria include screen size, likelihood of viewing a certain number of search results, and one or more characteristics of each source.

As an example of screen size, if client 140 is a desktop computer that has a 27 inch monitor, then client 140 may be able to display 20 search results at any one time. As another example, if client 140 is a smartphone with a 3 inch display, then client 140 may be able to display only 4 search results at any one time. Hotel information processor 130 may have data that indicates the screen size of client 140 or may estimate how many search results may be displayed on client 140 based on one or more factors. Hotel information processor 130 uses the (e.g., estimated) screen size to determine M.

The first M search results may be based on one or more other criteria, such as how likely is the user to view a certain number of search results, all of which may or may not fit simultaneously on the screen of client 140. This criterion may be used in addition to or alternative to the screen size. The likelihood may be the same for all users or may be tied to the specific user of client 140. For example, if the user of client 140 is known to view at least the top 50 search results in a short period of time, then one source request is generated for the first 50 search results and another source request is generated for the next 100 search results.

Examples of characteristics of a source include speed or response time and request size restrictions of each source. For example, if source 110A is relatively slow in responding to source requests, then hotel information processor 130 sends a source request that requests a relatively small amount of information (e.g., in the form of the number of hotel identifiers). Conversely, if source 110B is relatively fast in responding to source requests, then hotel information processor 130 sends a source request that requests a relatively large amount of information (e.g., in the form of the number of hotel identifiers). Also, some sources may have different restrictions on the size of each request. For example, some sources may not accept source requests with more than 100 hotel identifiers or may intentionally respond more slowly to source requests of that size. As another example, some sources may only accept a certain number of source requests in a certain period of time (e.g., 10 source requests per minute). Thus, source requests to such sources may be intentionally made larger than the source requests might otherwise have been.

Two or more source requests may be sent to the same source (e.g., source 110A) concurrently or simultaneously. Alternatively, a subsequent source request may be sent after one or more criteria are satisfied. The one or more criteria may be, for example, the lapse of a certain amount of time (e.g., 5 seconds) or the reception of data from client 140 that indicates that the user has scrolled down the list of search results, indicating that the user desires to view one or more of the next N search results.

Each search result that is displayed on client 140 may include information from multiple sources of sources 110A-C. For example, one of the search results sent in block 330 may be for a hotel for which multiple sources have information, such as pricing, availability, and deals. In an embodiment, block 340 involves generating two or more source requests that are directed to different sources (e.g., source 110A and source 110B) and sending the two or more source requests to the different sources simultaneously or near simultaneously. This is referred to herein as the "multiple source technique."

In an embodiment, hotel information processor 130 implements the multiple request-per-source technique and the multiple source technique. For example, in response to a client request from client 140, hotel information processor 130 generates at least two requests for source 110A and at least two requests for source 110B.

Block 340 also involves sending the one or more source requests to the appropriate sources.

Block 340 may occur in response to receiving, from client 140, one or more client requests, each of which identifies a set of HIDs. Client 140 may have determined which search results are of higher priority relative to other search results. For example, higher priority search results may be those that may be displayed first in a search results page (e.g., 10) and those that will be displayed as the user initially scrolls down his/her screen (e.g., 20), while lower priority search results may be search results 31-200, which the user is less likely ever to view. Thus, client 140 may generate a plurality of requests that hotel information processor 130 translates into a plurality of source requests. While the number of search results that may be displayed is one criterion for client 140 (or hotel information processor 130) to determine how many hotel identifiers will be in each source request, other criteria may be used. For example, if distance and price are the most common sorting features, then at least two client requests are generated in a way that the first source request covers the top X (e.g. 10) hotels according to the two sort criteria (so in total, somewhere between 10 to 20 hotels may be identified in one source request depending on the overlap that may happen with sorting criteria), and the second source request covers the rest of the hotels.

In a related embodiment, hotel information processor 130 receives a single client request and generates multiple source requests based on the single client request. In other words, instead of client 140 intelligently generating multiple client requests, hotel information processor 130 is configured determine how best to request hotel data from a particular source.

While client 140 is waiting for search results based on one or more client requests that client 140 sends to hotel information processor 130, then client 140 may display a loading icon for search results for which data has not yet been received from hotel information processor 130. The loading icon is a visual indicator that some information (e.g., current price or current availability) is still waiting to be determined and displayed. Thus, while a screen of client 140 may be capable of displaying 50 search results, current pricing information may be available only for the top 20 search results, while the next 30 search results indicate that client 140 is still waiting for current pricing information.

Block 340 may also involve associating a key with each client request and sending the key back to client 140. The key represents data that is requested in the client request. For example, the key represents or is associated with hotel identifiers included in the client request. Later, if client 140 has not received any or all of the hotel information pertaining to hotels identified in a particular client request, then client 140 may send the key to hotel information processor 130 instead of sending the hotel identifiers again. Hotel information processor 130 uses the key to determine whether any results (associated with the particular client request) have been received from one or more sources.

At block 350, results from one or more of the source requests are received and sent to client 140. The results include SIDs and information about each hotel identified by the SIDs. For example, the information may include pricing information and availability information about a certain date or range of dates. Block 350 may involve using the HID-to-SID mapping to translate SIDs reflected in the results into HIDs.

At block 360, a second request is received from client 140. This client request may be generated by client 140 in response to the user scrolling down a user interface display. For example, a user of client 140 may have selected a down arrow key on a keyboard of client 140. As another example, the user may have moved his/her finger in an upward motion while pressing a touchscreen of client 140. Regardless of the type of input, the input indicates that the user desires to view more search results that are currently not displayed to the user. The second client request may include HIDs of search results that are to be displayed based on the input. Alternatively, the second client request may simply indicate a request to view the next few search results after the first M search results. If hotel information processor 130 maintains information about which hotels are reflected in the search results identified for client 140, then hotel information processor 130 may implement this approach, where client 140 is not required to specify which search results need to be updated. Otherwise, hotel information processor 130 may rely on client 140 to inform hotel information processor 130 regarding which hotels about which client 140 needs up-to-date information.

While block 360 is described as occurring after block 350, block 360 may occur before block 350. Indeed, block 360 may occur before any results are received from one of the source requests sent in block 340.

At block 370, a set of search results is determined. The set of search results are those that will be requested from one or more sources and that correspond to search results that are requested from client 140. For example, hotel information processor 130 implements a multiple request-per-source technique and has received, from source 110A, a response to a source request for the first M search results, but has not received, from source 110A, a response to a source request for the next N search results. At this point in time, the second client request is received and includes five HIDs. One reason for sending smaller requests for the portion the user is currently looking at in addition to bigger requests is because smaller requests tend to return significantly faster for many sources. One goal in client-server interaction is to maximize responsiveness by fetching relevant portion(s) that the user is most likely to interact with first.

At block 380, one or more source requests are generated and sent to one or more sources. The one or more source requests specify SIDs that map to the HIDs determined in block 370. Again, block 380 may be performed prior to receiving results from one of the source requests sent in block 340.

At block 390, results of at least one of the one or more source requests sent in block 380 are received and sent to client 140. These results may be received before results from a source request sent in block 350 due to the "size" of the source request, or rather to the amount of data requested by the respective source requests. For example, a source request sent in block 340 may be for 100 hotels while a source request sent in block 380 may be for five hotels.

Efficient Cache Layer

In an embodiment, hotel data is stored based on hotel location. For example, information about hotels located in San Francisco is stored together while information about hotels located in Los Angeles is stored together. Storage may include volatile media (e.g., cache, RAM, etc.) or non-volatile media (e.g., magnetic disks, FLASH, etc.). Because (1) information about hotels that are located geographically near each other is stored together and (2) user queries are typically based on a particular location (e.g., city or locale), retrieval of relevant hotel information may be significantly faster.

In an embodiment, the information may include detailed information such as availability on certain dates and/or hotel rates (e.g., cost for reserving for a day or another time duration). In a related embodiment, not only is hotel information organized by location, hotel information may be organized based on date availability. Thus, for example, first hotel data that identifies only hotels that are located in San Francisco and that have openings on Nov. 20, 2015 is stored in a first region of storage, while all information about hotels that are located in San Francisco and that have openings on Nov. 30, 2015 is stored in a second (different) region of the storage.

Frontend Design to Support Queries

A user of client 140 may initiate numerous queries that are sent to hotel information processor 130. In response to each query, hotel information processor 130 provides a response to client 140. If done unintelligently, client 140 may experience significant delay, especially if the network bandwidth between client 140 and hotel information processor 130 is low or if the network bandwidth between hotel information processor 130 and one or more of sources 110A-C is low.

Factors other than bandwidth may affect response times. Other factors might include network latency and source latency. For example, a satellite connection may have a latency of half a second or more, even though there may be a significant amount of bandwidth. In that case, it would take at least twice the latency to get back any reply to a request. With respect to source latency, a query from hotel information processor 130 to source 110A, for example, may take 200 ms. However, it may take significant amount of time (e.g. in seconds) for source 110A to process and return results. Thus, even though every part in the network may have high bandwidth and low latency, results may still be received with high latency (due to computation time or internal processing time of the source).

In an embodiment, instead of causing the entirety of a display on client 140 to be generated, hotel information processor 130 sends HIDs and, optionally, other information that software on client 140 uses to update the display. For example, if the display includes a list of hotels that match a search and the user selects an option to view hotels that are available on a different date, then client 140 sends, to hotel information processor 130, the new date and HIDs of the hotels about which information is currently stored/displayed on client 140. In this way, hotel information processor 130 does not have to (at least immediately) re-process the previous search. Instead, hotel information processor 130 determines a new set of hotels based, at least primarily, on the HIDs sent from client 140.

Hotel Descriptions

In an embodiment, hotel information processor 130 stores, for each of multiple hotels, description data that describes the corresponding hotel. The description may be provided by one or more of sources 110A-C or by the hotel itself. Additionally or alternatively, the description may be provided by patrons or other users who have personally experienced the hotel by, for example, examining the lobby of the hotel, ordering food or drink at a bar or nightclub of the hotel, and/or reserving a hotel room for a night.

Thus, a description of a particular hotel may be divided or segregated into different sections, each one originating from the same or different source. For example, one section may have originated from the particular hotel, another section may have originated from a hotel content aggregator, another section may have originated from an unaffiliated patron ("unaffiliated" with respect to the operator of hotel information processor 130), and another section may have originated from an employee of the operator of hotel information processor 130.

Examples of information that is contained within a description may include "our take" on a hotel, a description of a hotel with a more "human touch" than most hotels or content aggregators provide, insider information such as noise levels at various locations in a hotel, tips for quieter areas, comments on views (e.g., ocean view, river view, mountain view, city view, etc.), or size information (e.g., regarding rooms that are bigger or smaller than their typical category at the same price).

In an embodiment, hotel information processor 130 allows users (e.g., a user of client 140) to view individual descriptions and search across descriptions of multiple hotels. An example situation in which a user may desire to search across multiple hotels is if the user enters "San Francisco" into a search field of a user interface and submits the query. In response, hotel information processor 130 identifies multiple hotels that are in San Francisco and provides, to the user, search results, each of which contains information about a different one of the multiple hotels. After viewing the search results, the user enters "free breakfast" into a search field of the user interface and submits the query. The query sent to hotel information processor 130 may include an HID for each hotel indicated in the search results.

One approach to searching across the multiple hotels is to lookup each description using the HIDs and scan each description for the phrase "free breakfast." However, when descriptions of tens or hundreds of hotels must be scanned, the processing time can be significant and the user may have to wait a substantial amount of time before results of the second query are displayed.

Another approach to searching across the multiple hotels is to build an index where each term or phrase is associated with a physical storage location or with a logical storage location, such as a HID, an offset into the description, and a length value. However, such an index tends to be very large, requiring a significant amount of storage resources.

Indexing Textual Content

In an embodiment, hotel information processor 130 generates an index that takes advantage of the relatively small size of hotel descriptions. The index may be used to generate textual snippets (which are later displayed on a client device) and/or to score search results, which scoring results in ordering (or re-ordering) search results.

Figure 4:
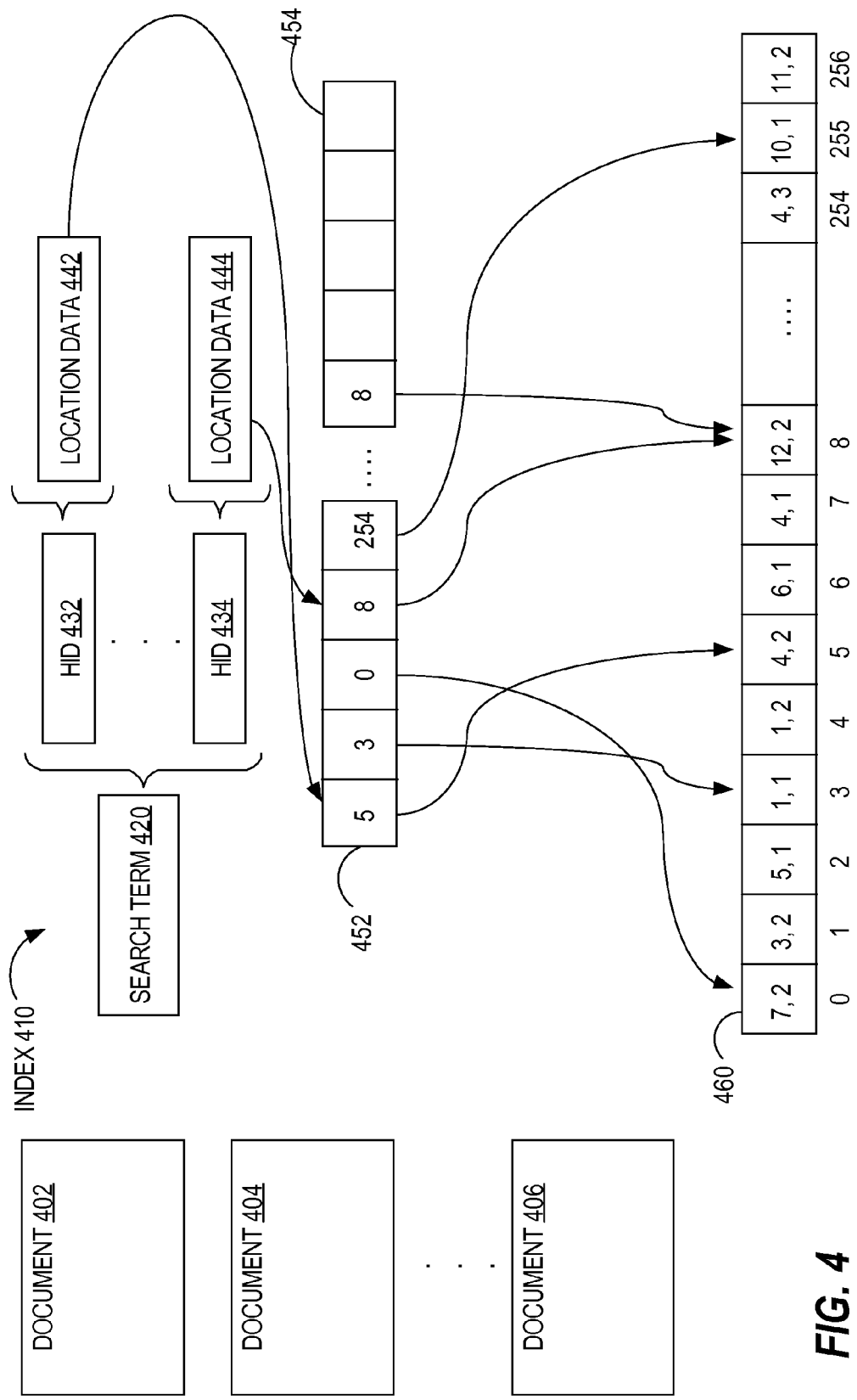
FIG. 4 is a block diagram that depicts various data structures that implement an index on hotel descriptions contained in multiple documents, in an embodiment.

FIG. 4 is a block diagram that depicts various data structures that implement an index 410 on hotel descriptions contained in documents 402-406, in an embodiment. Index 410 indexes terms and/or phrases that are found in documents 402-406. Although three documents are depicted, index 410 may index content from many more documents. Documents 402-406 are stored in non-volatile storage and/or in volatile storage. Each of documents 402-406 correspond to different descriptions. For example, document 402 contains a description of Hotel A while document 404 contains a description of Hotel B. As another example, both documents 402 and 404 contain a description of Hotel A, although the descriptions reflected in documents 402 and 404 are from different sources.

Different elements of index 410 may be stored on a single machine or may be spread among different machines. For example, different storage devices may store information for different HIDs, such as descriptions and intermediate data structures that are of the same type as data structures 452 and 454. As another example, a copy of document-independent data structure 460 (described in more detail below) may be stored on each of multiple distinct storage devices.

In index 410, a search term is associated with one or more HIDs. An HID associated with a search term indicates that a description of hotel identified by the HID contain the search term. In the depicted example, search term 420 is associated with at least two HIDs. However, in other embodiments, a search term may be associated with more or less HIDs. An HID associated with a search term allows a process that is identifying descriptions that contain the search term to identify the appropriate documents (e.g., one or more of documents 402-406). The remaining data structures contain information that does not necessarily contain information about which documents contain the search term.

Each HID is associated with location data. In the depicted example, HID 432 is associated with location data 442. Embodiments of the invention are not limited to any particular format of the location data. For example, location data 442 may be a set of two addresses: a start address and an end address. The start address may indicate a physical address of an entry in (document-dependent) data structure 452. Alternatively, the start address may indicate an offset that indicates a number of entries into data structure 452 from the beginning of data structure 452. As another example, location data 442 may be a start address (indicating where the corresponding entry is located in data structure 452) and an offset, indicating a number of entries from the start address. In the depicted example, location data 442 points to an entry in data structure 452 that contains the value '5'.

It is important to note that location data (e.g., location data 442 and location data 444) do not point to any of documents 402-406 directly, as a traditional index might. Instead, location data points to one or more intermediate data structures, such as data structures 452 and 454.

Data structure 452 is a set of entries that each contains an index value into document-independent data structure 460. Data structure 452 may be stored as a set of entries that are stored contiguously on disk. Alternatively, the set of entries may comprise separate chunks of contiguous memory, such that the chunks are not contiguous with respect to each other. For example, as new search terms are identified and/or new (non-indexed) descriptions are received at hotel information processor 130, hotel information processor 130 determines whether an existing allocated chunk of memory (e.g., data structure 452) contains unused memory. If so, hotel information processor 130 uses the allocated, but unused memory to store index information for new search terms. If not, then hotel information processor 130 allocates a new chunk of memory (e.g., data structure 454) to store index information for the newly identified search terms. The new chunk of memory may be much larger than what is immediately needed to store index information for newly identified search terms.

The number of entries in an intermediate data structure (such as data structure 452) that correspond to particular location data is an indication of how many times a corresponding search term is found in a description of a hotel. For example, if location data 442 corresponds to three entries in data structure 452 (e.g., which, in the start address-plus-offset embodiment, may be indicated by an offset of 2), then search term 420 is found in three different locations within a description of a hotel of HID 432. As another example, if location data 444 corresponds to a single entry in data structure 452 (e.g., which, in the two-address embodiment, may be indicated by the end address being the same as the start address), then search term 420 is found in one location within a description of a hotel of HID 434.

Document-independent data structure 460 comprises a plurality of entries, each entry including data that identifies a logical location within a document. The logical location, however, is not specific to any particular document. For example, the ninth entry (index position 8) may include data that is used to identify (1) "complimentary" in document 402 in response to a first query and, later, (2) "balcony" in document 404 in response to a second query.

Embodiments of the invention are not limited to how the logical location in an entry of data structure 460 is formatted. For example, a logical location may comprise two values: a start offset and an end offset. The start offset may be a byte offset or a word offset from the beginning of a document. The end offset may be a number of words or bytes from the start offset or from the beginning of a document.

If index 410 did not include data structures 452 and 460 and instead was implemented by placing the values in the entries in data structure 460 in location data (e.g., location data 442 and 444), then the location data would contain a lot of duplicate values, thus increasing the size of index 410 substantially. Not only might a typical index implementation not include data structures 452 and 460, it would mostly use, as location data, 4 bytes for the start location and 4 bytes for the end location. However, in an embodiment, entries in data structure 460 each contain 2 bytes to represent an offset value (into a document) and, optionally, a length. Thus, in the embodiment of FIG. 4, index 410 may be an order of magnitude less than a typical index implementation.

Sections

The restriction on the size of documents 402-406 allows index 410 to be implemented efficiently using the data structures depicted in FIG. 4. For example, each of documents 402-406 is limited to be under 64 KB. However, some descriptions may be too large to fit into a single document of size 64 KB.

In an embodiment, an HID is associated with one or more sections and each section is associated with separate location data. Sections may be used if a document is greater than a particular size (e.g., 64 KB). The size of a document matters because there is a restriction on the number of index offsets that are to be stored in document-independent data structure 460 (described in more detail below). The larger the size of a document, the larger data structure 460 must be to accommodate the large number of possible offsets into the document. Therefore, when indexing content of a document (e.g., document 406), hotel information processor 130 determines the size of the document. If the size of the document is greater than a particular threshold size (e.g., 64 KB), then hotel information processor 130 (logically or physically) divides the document into sections, such that each section is not greater than the particular threshold size. In addition to identifying, in the document, a search term that is to-be indexed by index 420, hotel information processor 130 (1) determines which section of the document the search term is located and (2) stores information that distinguishes that section from other sections of the document. A byte or a few bits may be used to indicate in which section of the document a search term is located.

There are multiple ways in which different sections of a document may be divided. For example, a document may be physically divided into different sections by creating different documents, which may or may not be stored contiguously with respect to each other. Each section may be associated with a different physical address that is used to quickly locate the document section in memory. One reason for using contiguous chunks is that it is a lot less efficient to allocate smaller amounts of variable length memory chunks. If data is allocated separately on an as-needed basis, then memory requirements are typically significantly higher. For example, if variable length memory chunks are allocated (e.g., 8 bytes to 40 bytes), then each allocation has an overhead associated with it and, for smaller chunks, this overhead could be very significant with respect to the actual amount of memory that is being allocated.

As another example, a document may be logically divided into different sections by maintaining an offset for a particular section, where the offset indicates where in a document the section begins. Thus, the "sections" of a document are stored contiguously with respect to each other. As a specific example, an HID associated with a search term may be associated with three sections in a document that comprises three sections. Thus, the search term is found in the first, second, and third sections of the document. When traversing index 410 based on the search term, hotel information processor 130 determines that there are three sections. Such a determination may be based on the HID being associated with three section identifiers. The section identifiers associated with a particular hotel that is associated with one search term may or may not be unique relative to other section identifiers in index 410. If not unique, then a separate section-to-location mapping (i.e., that maps sections associated with a particular hotel to storage locations) may be used to determine the storage location of a particular section.

In an embodiment, a single byte (i.e., 8 bits) is used to store information about which section a search term is found. One byte means that a hotel (and, thus, an HID) may be associated with 256 sections. Because hotel descriptions are relatively short in length, it is unlikely that multiple descriptions of a hotel will exceed 256 sections. In other embodiments, more or less bits are used to identify a particular section from among a plurality of sections associated with a hotel.

Additionally or alternatively to using sections for documents that are greater than a particular size, sections may be used to distinguish one type or source of content from another type or source of content. As described previously regarding source, one section associated with a particular hotel may be provided by the hotel, another section may be from a hotel aggregator, and yet another section may be from an "insider's take." As an example regarding type, one section may be about amenities of the hotel, another section may be about nightlife near the hotel, and yet another section may be about the best rooms within the hotel.

In a related embodiment, each HID is associated with section information that comprises two values: a start location and a length value. The start location indicates a location within a section data structure (not shown) that is different than data structures 452 and 460. The length value indicates a number of entries in the section data structure. For example, if the length value is 5, then that means the corresponding search term appears in 5 sections that are associated with the corresponding HID. Thus, each entry in the section data structure corresponds to a different section. The section data structure may be implemented as a deque data structure that allows for efficient memory allocation.

Each entry in the section data structure may include the following information: a section type identifier (which may be 1 byte in length), a pointer to the beginning of the section in memory, a start location, and a length value. The start location is used to identify an entry in location data structure 452. The length value indicates a number of times in which the corresponding search term appears in the corresponding section.

In an alternative embodiment, a hash map is used to identify HIDs that are associated with a particular search term. In this embodiment, the particular search term is input to a hash function that generates a hash value based on the search term. The hash value is used to look up, in a first data structure (e.g., a vector or an array), an entry that includes one or more HIDs. Each HID is then input to a second hash function that generates a second hash value that is used to look up, in a second data structure (e.g., a vector or an array), an entry that includes section information that identifies one or more sections. The entry itself may point to or comprise a vector or a deque data structure, where each entry includes a pointer to a section, a start location in location data structure 452, and a length value.

Traversing the Index

Figure 5:
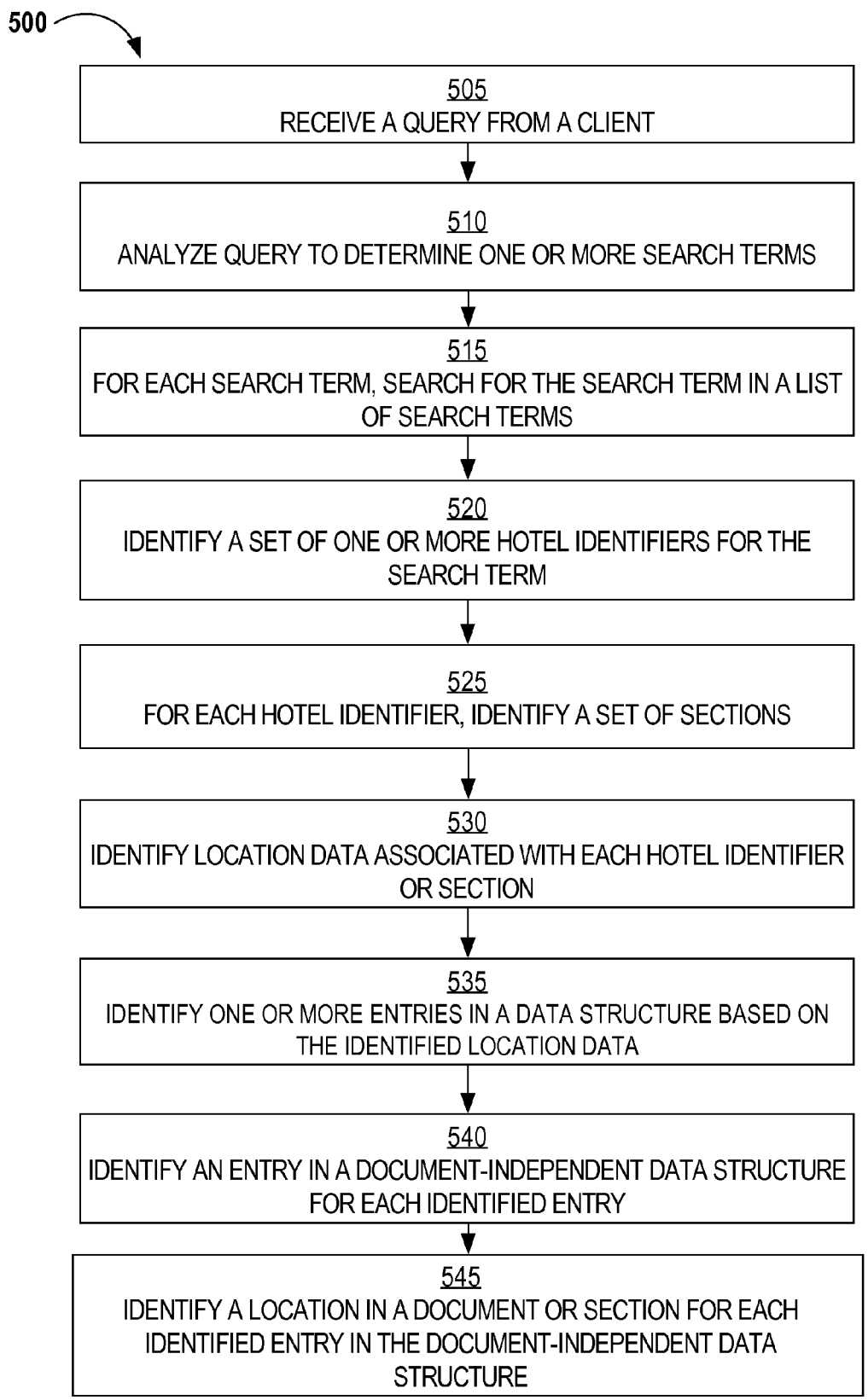
FIG. 5 is a flow diagram that depicts a process for traversing the index, in an embodiment.

FIG. 5 is a flow diagram that depicts a process 500 for traversing index 410, in an embodiment. Process 500 is performed by hotel information processor 130.

At block 505, a query is received from client 140. The query comprises one or more terms. If the query comprises multiple terms, then the multiple terms may be delimited by one or more characters, examples of which include a space character, a comma, a semi-colon, and a period.

At block 510, the query is analyzed to determine one or more search terms. The one or more search terms may be the same as the one or more terms in the query or may be different. For example, the query may be "New York City" (which is three terms) and hotel information processor 130 determines that "New York City" is a single search term.

Block 510 may initially begin with a normalization phase where one or more normalization techniques are applied to the query term(s). Example normalization techniques may include removing non-alphanumeric characters (e.g., "." ";" "<"), changing any uppercase characters to lowercase characters, and stemming. For example, a query term "balconies" may become "balcony." Alternatively, both "balconies" and "balcony" become terms in the determined set of search terms.

Block 510 may also involve query expansion. For example, the query may be "free food" and hotel information processor 130 adds "complimentary" (as a synonym for "free"), removes the term "food," and adds the term "breakfast." Thus, the search terms are "free," "complimentary," and "breakfast."

In an alternative embodiment, block 510 is not performed and process 500 proceeds from block 505 to block 515.

At block 515, for each search term determined in block 510, the search term is searched for in a list of search terms. The list of search terms may be stored and maintained in any manner. For example, the list of search terms may be ordered alphabetically. Also, the search terms may be divided such that, for example, search terms that begin with 'A' are listed in one file or document and search terms that begin with 'B' are listed in another file or document. Alternatively, the list of search terms is itself indexed. In the example of FIG. 4, one of the search terms of the query is search term 420.

At block 520, for each search term identified in block 515, a set of one or more HIDs is identified. A mapping may be stored that associates, for each search term, a set of one or more HIDs. The list of search terms described above may contain, for each search term in the list, a list of one or more HIDs.

At block 525, for each HID identified in block 520, a set of sections (or section offsets) are identified. A separate mapping may be stored that associates for each HID associated with the search term, a set of one or more section identifiers. Alternatively, the list that associates a search term with an HID also contains a list of section identifiers for each HID (or at least for those HIDs that are associated with documents that comprise multiple sections). Block 525 may be unnecessary if a document corresponding to an HID is less than a particular size (indicating no sections) or if all documents are limited to being less than the particular size.

At block 530, location data associated with each identified HID (or section identifier) is identified. For example, if search term 420 is associated with two HIDs, neither of which is associated with a section identifier, then two sets of location data are identified. As another example, if search term 420 is associated with two HIDs, one of which is associated with two section identifiers and the other of which is not associated with a section identifier, then three sets of location data are identified.

At block 535, for each set of location data identified in block 530, one or more entries in data structure 452 (or data structure 454) are identified. For example, location data 442 is used to identify the first three entries in data structure 452. The first three entries indicate index values of '5,' '3,' and '0.'

At block 540, for each entry identified in block 535, an entry in document-independent data structure 460 is identified. In the previous example, the entries at index positions '0,' '3,' and '5' are identified.

At block 545, for each entry in document-independent data structure 460 identified in block 540, a location in a document (associated with an HID (identified in block 520)) or section (if sections are different than documents) (associated with a section identifier) is identified. In the previous example, the entry at index position '0' of data structure 460 contains '7' as a starting offset and '2' as an ending offset that is calculated form the starting offset. Thus, if, in block 520, an HID associated with document 402 was identified, hotel information processor 130 identifies a location within document 402 based on the starting offset and the ending offset.

Snippet Generation

As noted previously, index 410 may be used for snippet generation. In snippet generation, an aim is to identify not only specific search terms, but also text that is adjacent to the search terms. For example, if a query is "free food" and the search terms are "free" "complimentary" and "breakfast", then index 410 is used to identify document(s) that contain one or more of the search terms and to identify, within the identified document(s), terms that precede and/or follow the one or more search terms. For example, in response to identifying the search terms "free" and "breakfast" in document 404, the entire sentence (or portion thereof) that includes those search terms is (1) identified (e.g., by looking for a period or semi-colon that precedes "free" and a period or semi-colon that follows "breakfast") and (2) extracted to generate a snippet that may be returned and displayed to a user of client 140.

Sentence boundaries are one example of a type of stopping point that may be used to identify a snippet. Another type of stopping point may be identifying certain structured data, such as new lines and the beginning or ending of a paragraph. If a snippet starts or ends near a natural stopping point, then the snippet may be expanded or shrunk to align with the natural stopping point.

In an embodiment, the number of snippets for each particular hotel is limited. For example, there may be a limit of three snippets, for each hotel, that may be provided to client 140 at any one time. Thus, if four snippets are generated in response to a query, then one of the four snippets is selected for exclusion when providing the snippets to client 140. The choice of which snippet to exclude may be based on which snippet is associated with the lowest score (described in more detail below).

Snippet generation may take into account many factors to determine which portions of document to extract, if at all. One factor may include section importance or priority. For example, sections that correspond to "trusted" reviews that are provided, for example, by an employee of the owner or manager of hotel information processor 130 may be given higher priority than sections that are provided by the hotel itself. Another factor may include the strength of the match. For example, if multiple search terms are within a certain distance of each other in a single document, then the match is considered high. Conversely, if multiple search terms are not within a certain distance of each other in a single document (e.g., "free" and "breakfast" do not appear in the same sentence), then the match is considered low. As another example, if only one of multiple search terms is found in a document, then the match is considered low.

In an embodiment, multiple snippets that are close in vicinity to each other (e.g., the same paragraph or within one or more two paragraphs) are generated for the particular hotel, expanded or shrunk, and scored. One or more of the potential snippets are then selected from among the multiple potential snippets based on the score assigned to each of the potential snippets.

In an embodiment, during snippet generation, candidate snippets are merged into a larger snippet that is returned in response to a query. Example criteria that may be used to determine whether to merge two or more candidate snippets include how many query terms are included in a potential snippet that would be generated by merging two candidate snippets, the relative importance of the query term(s), and the length of potential snippet.

In an embodiment, structured data is surfaced in various forms when applicable using keyword or similarity-based triggers. For example, if one or more query terms match structured data fields that are extracted or produced by hotel information processor 130, then "special" answers are triggered. As a specific example, if a query includes "internet," "wifi," and "high-speed," then structured information is surfaced in query results, such as tags or icons next to search results of hotels that have Internet access, WiFi, or high-speed Internet. As another example, if a query includes the terms "checkin" or "checkout," then check-in and/or checkout times of each hotel indicated in search results are displayed in addition to or instead of a snippet. If multiple structured data is triggered in response to a single query, then as many triggers may be added as practical.

In an embodiment, term(s) of a query are used to highlight a hotel profile page. In this way, if a user selects a search result or a snippet (i.e., that corresponds to a particular hotel) and is taken to a detailed page about the particular hotel, then term(s) relevant to the previous search are highlighted. The highlighted term(s) may be an exact match or might have undergone stemming or synonym expansion.

Scoring

As noted previously, index 410 may be used for scoring snippets and/or scoring search results. Factors that may be used in scoring a snippet include the importance of search term(s) (e.g., reflected by TF/IDF or "term frequency-inverse document frequency," which is a numerical statistic which reflects how important a word is to a document in a collection or corpus), the location(s) of the search term(s), importance of the section in which the search term(s) appears, and location of one or more search terms relative to another search term. For example, if two search terms are adjacent to each other or appear "close" to each other in a snippet, then the snippet is scored higher than if the two search terms were relatively distant from each other in the snippet.

As another example, with respect to section importance or priority, sections that correspond to "trusted" reviews that are provided, for example, by an employee of the owner or manager of hotel information processor 130 may be higher priority than sections that are provided by the hotel itself.

For structured descriptions, the section in which a search term appears may be a factor in scoring a snippet. For example, if a search term is found within a header or is bolded, then the search term is scored higher than if the search term was found as normal text (e.g., not in a header and not bolded).

If identifying documents in response to the query involves scoring the documents so that the documents may be ranked (or re-ranked), then one of multiple scoring techniques may be implemented. In the "free food" query example, one scoring technique may look for all three search terms (i.e., "free," "complimentary," and "breakfast") in a single document and score the results accordingly, penalizing any identified document that did not contain all three search terms. A more sophisticated scoring technique may look for documents that contain "breakfast" and either "free" or "complimentary" and, thus, not penalize documents that only contained either "free" or "complimentary" and not both. Thus, the more sophisticated technique does not automatically treat multiple search terms as being combined using a conjunctive operator.

In an embodiment, before a snippet for a particular hotel is provided to a client (e.g., client 140), multiple potential snippets are generated for the particular hotel, expanded or shrunk, and scored. One or more of the potential snippets are then selected from among the multiple potential snippets based on the score assigned to each of the potential snippets.

Partner API Integration

The APIs provided by each of sources 110A-C may vary in their input and output parameter structures. The APIs of sources 110A-C may be grouped into the following categories: hotel-based search, city-based search, and coordinate-based search.

In an embodiment, hotel information processor 130 uses a flexible API structure that can be adapted to a source's search API. In order to integrate with the source APIs, a search query structure that contains the following parameters are used: HIDs, city IDs (optional), and coordinates (optional). These parameters may be used by different search APIs as follows.

For a hotel-based search, a mapping is generated that maps SIDs to HIDs. Later, a main searcher (executing on hotel information processor 130) sends a list of HIDs to a hotel-based searcher (executing on hotel information processor 130), which communicates with a particular source (e.g., source 110A). Using the mapping, the hotel-based searcher generates a list of SIDs that corresponds to the received list of HIDs.

Some of sources 110A-C may have a limit on the number of SIDs that can be handled by a single API call. In such cases, the SIDs may be grouped into multiple groups, and each group of SIDs is transmitted to the source from a separate thread.

Upon receiving replies from the source, the hotel-based searcher collects the results. Out of all the results, the hotel-based searcher takes only the HIDs that are in the HID list enumerated originally.

For a city-based search, a first mapping is generated that maps SIDs to HIDs and a second mapping is generated that maps SIDs to city IDs (recognized by the corresponding source). Later, the main searcher enumerates a list of desired hotels near a search location. Then the main searcher sends the list of HIDs to a city-based searcher (executing on hotel information processor 130), which communicates with a particular source (e.g., source 110B). Using the first mapping, the city-based searcher generates a list of SIDs that corresponds to the received list of HIDs. Using the second mapping, the city-based searcher generates a list of city IDs based on the list of SIDs. In order to prevent network bandwidth overflow, the number of city IDs may be limited to a reasonably small number. For each city ID, the city-based searcher uses the API associated with the source (e.g., source 110B) that utilizes a source-specific city-based search API.

In an embodiment, one or more city IDs may not be sent to a source. Instead, the city IDs may first be ordered based on how many HIDs (from the main searcher) to which each city ID corresponds. For example, once a certain percentage of hotels are requested, the city-based search stops. For example, the main searcher may request 1000 hotels, which requires 7 city-based API calls. However, only 4 city-based API calls may be necessary to retrieve information about 950 hotels (or 95% of what was originally requested). In this way, the number of queries of a city-based source is reduced.

Upon receiving replies from the source, the city-based searcher collects the results from all the cities. Out of the results, the city-based searcher takes only the HIDs that are in the original list of HIDs.

For a coordinate-based search, a first mapping is generated that maps SIDs to HIDs and a second mapping is generated that maps SIDs to coordinates (latitude and longitude) of the corresponding hotels. Later, the main searcher enumerates a list of desired hotels within a specified radius from a search coordinate. Then, the main searcher sends the list of HIDs to a coordinate-based searcher (executing on hotel information processor 130), which communicates with a particular source (e.g., source 110C). Using the first mapping, the coordinate-based searcher generates a list of SIDs that corresponds to the received list of HIDs. Using the second mapping, the coordinate-based searcher generates a list of coordinates based on the list of SIDs. The coordinate-based searcher uses the API associated with the source (e.g., source 110C) that utilizes a source-specific coordinate-based search API.

Upon receiving replies from the source, the coordinate-based searcher collects the results. Out of the results, the coordinate-based searcher takes only the HIDs that are in the original list of HIDs.

In an embodiment, if the API provided by a source supports asynchronous communication, then the main searcher responds back to the client (e.g., client 140) with a partial reply. This may repeat until all the desired reply is received from the source. This approach allows for a smooth user experience.

Duplicate Booking Prevention

In an embodiment, hotel information processor 130 includes a booking process that communicates with a source's booking API. The booking process includes a retry mechanism in case of network connectivity problems, but extra care needs to be taken to avoid making duplicate bookings in response to a single booking request.

In one embodiment of the booking process, a web page ("checkout" page) collects user information including name, address, credit card number and travel parameters including hotel ID, room category, check-in date, check-out date, number of guests and number of rooms. The webpage uses Javascript to send a "prebook" call to the web server (hosted by hotel information processor 130), which stores all information in a database table and generates a unique ID to be passed back to the Javascript client. No actual booking API call is sent to the booking source during this stage. Then, Javascript sends a "book" call to the web server with the unique ID it received from the previous step. The web server performs the booking by sending a booking API call to the booking source at this point. If the Javascript client does not receive a valid response within a predefined time window, then it retries with the same unique ID. The web server makes sure that if a booking with the same unique ID has already been processed (either confirmed success or confirmed failure), it would not retry again. If a booking with the same unique ID has an API call timed out with no response or terminated with invalid response, it is not clear whether a booking went through or not; in this case, the web server retries with the same unique ID only if the booking source supports duplicate prevention via client-generated unique IDs; otherwise, the booking record may be flagged for manual examination by a customer service team.

Blacklisting Hotels

In an embodiment, hotel information processor 130 maintains a record of successful bookings and failed booking attempts. For each of these success and failure records, the hotel, the room rate within the hotel, and the timestamp are recorded. For example, if a hotel data indicates that a particular hotel is available on a particular date, a user attempts to book/reserve the particular hotel for that date, and the particular hotel denies the book request, then hotel information processor 130 stores data that reflects that failure by the particular hotel.

For a particular hotel and a particular room rate within the hotel, hotel information processor 130 may be notified of the booking failure rate for the particular hotel and for the particular room rate. The booking failure rate is defined as the effective number of failed bookings divided by the sum of the effective number of failed bookings and the effective number of successful bookings. The effective number of failed (or successful) bookings is a time-decayed version of the actual number of failed (or successful) bookings. Each success or failure record decays over time from one to zero. The time-decay is designed to handle two primary cases: (1) when a particular hotel's booking failure rate is so high that it is placed in a blacklist (in which case the time-decay is a mechanism for removing the hotel from the blacklist after a sufficient amount of time has passed); and (2) when a particular hotel changes its systems to reduce (or increase) the number of failed booking attempts (in which case the time-decay is a mechanism to not give undue weight to booking attempts made a long time ago).

Such failure information may be used by hotel information processor 130 in a variety of ways. Some primary use cases include influencing ranking, blacklisting hotels, and displaying warning messages to the user. For example, in ranking, if a particular hotel has a sufficiently high booking failure rate, then, when ranking a set of hotels that are identified as part of a hotel search, a ranker will rank the particular hotel such that it has a lower score relative to other hotels in the set or simply that it has a lower score relative to what its score would have been if the particular hotel did not have that high of a booking failure rate. As another example, in blacklisting, if a particular hotel or particular hotel room rate has a sufficiently high failure rate, this hotel or rate will be removed until a sufficient amount of time has passed. As another example, in displaying warning message to the user, when providing a list of search results to a client (e.g., client 140) where the search results include the particular hotel, hotel information processor 130 may provide data (e.g., in the form of a text or a graphic) that warns the user about the possibility or likelihood of a failed booking if the particular hotel is selected for booking.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
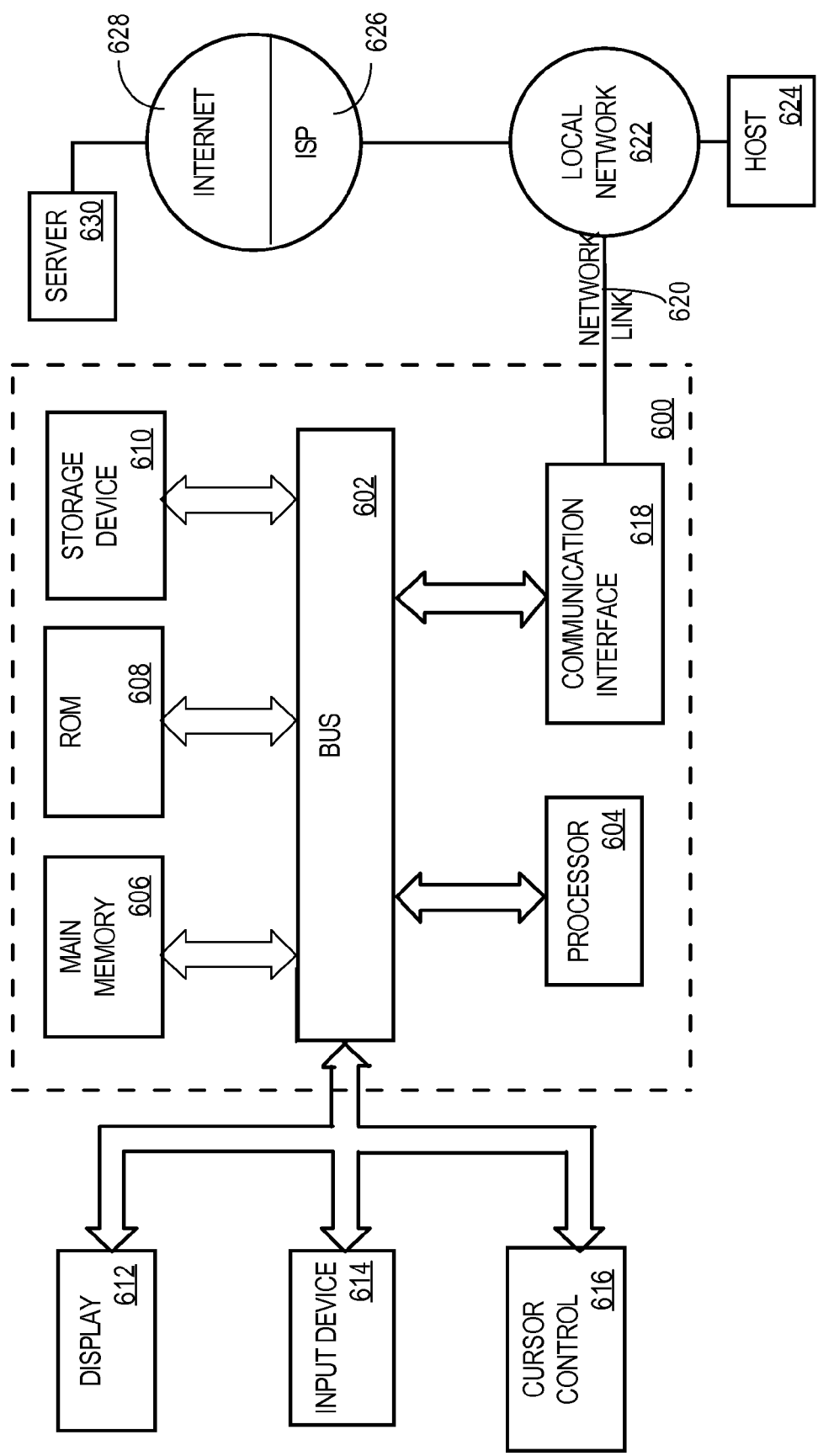
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a first query from a client over a network;
   identifying one or more first terms associated with the first query;
   based on a first term of the one or more first terms, identifying first location data that comprises an address of an entry in a first data structure or an offset into the first data structure;
   using the first location data to identify one or more first entries in the first data structure, wherein a first entry of the one or more first entries includes a first index value;
   using the first index value to identify a first set of one or more values in a second data structure that is different than the first data structure;
   wherein the first data structure comprises a plurality of entries, each of which contains an index value into the second data structure;
   using the first set of one or more values in the second data structure to identify a first location within a first document;
   wherein the method is performed by one or more computing devices.

2. The method of claim 1, wherein identifying the first location data based on the first term of the one or more first terms comprises:
   based on the first term, identifying one or more first hotel identifiers that are associated with the first term;
   based on a first hotel identifier of the one or more first hotel identifiers, identifying the first location data that is associated with the first hotel identifier.

3. The method of claim 2, wherein identifying the first location data that is associated with the first hotel identifier based on the first term of the one or more first terms comprises:
   based on the first term, identifying one or more first sections that are associated with the first term;
   based on a first section of the one or more first hotel identifiers, identifying the first location data that is associated with the first section.

4. The method of claim 1, further comprising:
   receiving a second query that is different than the first query;
   identifying one or more second terms associated with the second query;
   based on a second term of the one or more second terms, identifying second location data;
   using the second location data to identify one or more second entries in the first data structure, wherein a second entry of the one or more second entries includes the first index value;
   using the first index value to identify the first set of one or more values in the second data structure;
   using the first set of one or more values in the second data structure to identify a location within a second document that is different than the first document.

5. The method of claim 1, further comprising, after identifying the first location within the first document:
   generating, based on the first location, a snippet of text from the first document as a response to the first query;
   sending, to the client over the network, the snippet of text.

6. The method of claim 1, further comprising, after identifying the first location within the first document:
   generating, based on text within the first document, score data that is associated with the first document;
   sending, to the client, ranking data that is associated with the first document and that is based on the score data.

7. The method of claim 1, further comprising, in response to receiving the first query:
   identifying a plurality of hotel identifiers;
   generating, based on a first mapping and a first subset of the plurality of hotel identifiers, a second plurality of hotel identifiers;
   generating a first request that identifies the second plurality of hotel identifiers;
   sending the first request to a first source;
   generating, based on the first mapping and a second subset of the plurality of hotel identifiers, a third plurality of hotel identifiers;
   generating, based on a second mapping and the third plurality of hotel identifiers, a plurality of location identifiers;
   generating a second request that identifies the plurality of location identifiers;

sending the second request to a second source that is different than the first source.

8. The method of claim 1, further comprising:
generating a booking identifier and sending the booking identifier to the client;
receiving, from the client, a request to make a reservation at a particular hotel, wherein the request includes the booking identifier;
in response to receiving the request:
storing data that indicates a status of a booking request associated with the booking identifier, and
sending, to a source that is different than the client, the booking identifier and the request to make the reservation at the particular hotel.

9. The method of claim 1, further comprising:
organizing, in storage, information about a plurality of hotels based on location of each hotel of the plurality of hotels such that information about hotels that are geographically located near each other is physically stored together in the storage.

10. The method of claim 1, further comprising:
storing a first set of hotel data that identifies a first plurality of hotels and includes, for each hotel in the first plurality of hotels, a first plurality of attributes of said each hotel;
receiving, over a second network from a particular source, a second set of hotel data that identifies a second plurality of hotels and includes, for each hotel in the second plurality of hotels, a second plurality of attributes of said each hotel;
for a particular hotel in the second plurality of hotels:
performing a first comparison between (a) one or more attributes of the particular hotel and (b) one or more attributes of each hotel in a subset of the first plurality of hotels to identify a candidate set of hotels;
after identifying the candidate set of hotels, performing a second comparison between (c) one or more attributes of the particular hotel and (d) one or more attributes of each hotel in the candidate set of hotels to generate a score for each hotel in the candidate set of hotels; and
based on each generated score, storing data that indicates that the particular hotel matches a certain hotel in the candidate set of hotels.

11. One or more non-transitory storage media carrying instructions which, when executed by one or more processors, cause:
receiving a first query from a client over a network;
identifying one or more first terms associated with the first query;
based on a first term of the one or more first terms, identifying first location data that comprises an address of an entry in a first data structure or an offset into the first data structure;
using the first location data to identify one or more first entries in the first data structure, wherein a first entry of the one or more first entries includes a first index value;
using the first index value to identify a first set of one or more values in a second data structure that is different than the first data structure;
wherein the first data structure comprises a plurality of entries, each of which contains an index value into the second data structure;
using the first set of one or more values in the second data structure to identify a first location within a first document.

12. The one or more non-transitory storage media of claim 11, wherein identifying the first location data based on the first term of the one or more first terms comprises:
based on the first term, identifying one or more first hotel identifiers that are associated with the first term;
based on a first hotel identifier of the one or more first hotel identifiers, identifying the first location data that is associated with the first hotel identifier.

13. The one or more non-transitory storage media of claim 12, wherein identifying the first location data that is associated with the first hotel identifier based on the first term of the one or more first terms comprises:
based on the first term, identifying one or more first sections that are associated with the first term;
based on a first section of the one or more first hotel identifiers, identifying the first location data that is associated with the first section.

14. The one or more non-transitory storage media of claim 11, wherein the instructions, when executed by the one or more processors, cause:
receiving a second query that is different than the first query;
identifying one or more second terms associated with the second query;
based on a second term of the one or more second terms, identifying second location data;
using the second location data to identify one or more second entries in the first data structure, wherein a second entry of the one or more second entries includes the first index value;
using the first index value to identify the first set of one or more values in the second data structure;
using the first set of one or more values in the second data structure to identify a location within a second document that is different than the first document.

15. The one or more non-transitory storage media of claim 11, wherein the instructions, when executed by the one or more processors, cause, after identifying the first location within the first document:
generating, based on the first location, a snippet of text from the first document as a response to the first query;
sending, to the client over the network, the snippet of text.

16. The one or more non-transitory storage media of claim 11, wherein the instructions, when executed by the one or more processors, cause, after identifying the first location within the first document:
generating, based on text within the first document, score data that is associated with the first document;
sending, to the client, ranking data that is associated with the first document and that is based on the score data.

17. The one or more non-transitory storage media of claim 11, wherein the instructions, when executed by the one or more processors, cause, in response to receiving the first query:
identifying a plurality of hotel identifiers;
generating, based on a first mapping and a first subset of the plurality of hotel identifiers, a second plurality of hotel identifiers;
generating a first request that identifies the second plurality of hotel identifiers;
sending the first request to a first source;
generating, based on the first mapping and a second subset of the plurality of hotel identifiers, a third plurality of hotel identifiers;
generating, based on a second mapping and the third plurality of hotel identifiers, a plurality of location identifiers;

generating a second request that identifies the plurality of location identifiers;

sending the second request to a second source that is different than the first source.

18. The one or more non-transitory storage media of claim 11, wherein the instructions, when executed by the one or more processors, cause:

generating a booking identifier and sending the booking identifier to the client;

receiving, from the client, a request to make a reservation at a particular hotel, wherein the request includes the booking identifier;

in response to receiving the request:
storing data that indicates a status of a booking request associated with the booking identifier, and
sending, to a source that is different than the client, the booking identifier and the request to make the reservation at the particular hotel.

19. The one or more non-transitory storage media of claim 11, wherein the instructions, when executed by the one or more processors, cause:

organizing, in storage, information about a plurality of hotels based on location of each hotel of the plurality of hotels such that information about hotels that are geographically located near each other is physically stored together in the storage.

20. The one or more non-transitory storage media of claim 11, wherein the instructions, when executed by the one or more processors, cause:

storing a first set of hotel data that identifies a first plurality of hotels and includes, for each hotel in the first plurality of hotels, a first plurality of attributes of said each hotel;

receiving, over a second network from a particular source, a second set of hotel data that identifies a second plurality of hotels and includes, for each hotel in the second plurality of hotels, a second plurality of attributes of said each hotel;

for a particular hotel in the second plurality of hotels:
performing a first comparison between (a) one or more attributes of the particular hotel and (b) one or more attributes of each hotel in a subset of the first plurality of hotels to identify a candidate set of hotels;

after identifying the candidate set of hotels, performing a second comparison between (c) one or more attributes of the particular hotel and (d) one or more attributes of each hotel in the candidate set of hotels to generate a score for each hotel in the candidate set of hotels; and based on each generated score, storing data that indicates that the particular hotel matches a certain hotel in the candidate set of hotels.

* * * * *